June 18, 1935.  C. W. ROTHFELD  2,005,395
FOOD PREPARING DEVICE
Filed Jan. 3, 1933  3 Sheets-Sheet 2

Inventor
Charles W. Rothfeld

By Geo. P. Kimmel
Attorney

June 18, 1935.  C. W. ROTHFELD  2,005,395
FOOD PREPARING DEVICE
Filed Jan. 3, 1933  3 Sheets-Sheet 3

Inventor
Charles W. Rothfeld
By Geo. P. Kimmel
Attorney

Patented June 18, 1935

2,005,395

UNITED STATES PATENT OFFICE 2,005,395

FOOD PREPARING DEVICE

Charles W. Rothfeld, Philadelphia, Pa.

Application January 3, 1933, Serial No. 650,029

8 Claims. (Cl. 99—2)

This invention relates in general to food preparing devices, and more particularly has reference to a method and machine for cooking and seasoning such foods as stuffed sausages, Frankfurters or "hot dogs" or the like.

As is well known, various meats and meat products are customarily formed into units of substantially uniform size and shape either by cutting them to that shape, by grinding them and molding them to the desired shape or stuffing the ground food inside of a retaining membrane to retain them in the desired shape.

It has been customary in the past to prepare such meat foods as just described by roasting them over an open fire or in an oven, or by placing them in a suitable utensil and frying them. Each of these methods of course involves the application of heat to the outside of the units of food, and hence the outside portions of these units are usually fairly well cooked. However, the inner portions of these units are frequently if not always left in a more or less uncooked or raw state because they are remote from the points of application of heat. Furthermore, in both the roasting and the frying processes above mentioned, the valuable juices from the meat containing a great deal of the flavoring and food value thereof were usually lost so far as the meat was concerned, thus rendering the meat itself less palatable and less valuable as a food. Furthermore, unless the units were kept constantly in motion so as to expose all sides to the heat an exactly equal amount, certain parts of the same would obviously be cooked more than other parts.

In the prior practice, it has been customary to season foods such as described after they have been cooked, placing the seasoning on the outside of the food and depending on the subsequent mastication of the food to mix the seasoning therewith. No attempt has been made to inject into the food an exactly predetermined quantity of seasoning, the quantity being usually left to the discretion of the cook.

One object of this invention is therefore to provide a method of preparing foods which have been formed into units as above described in which the difficulties and disadvantages of the prior art will be eliminated.

Another object of this invention is to provide a method of cooking meat and particularly units of ground meat in which the cooking is performed from the inside of the units instead of from the outside.

Another object of this invention is to provide a means of cooking such foods by which the foods will be uniformly cooked throughout.

Another object of this invention is to provide a means of preparing foods of the type described by which the foods are first cooked from the inside, and by which a predetermined quantity of seasoning is then injected into the inside of the foods to make them more palatable.

Other objects and advantages of this invention will become apparent from the following description taken in connection with the accompanying drawings, and it is to be distinctly understood that the same are by way of illustration and example only and are not to be taken as in any way limiting the spirit or the scope of this invention. The spirit and scope of this invention are to be limited only by the prior art and by the terms of the appended claims.

Referring now more particularly to the drawings, in which like numerals indicate corresponding parts throughout:

Figure 1:
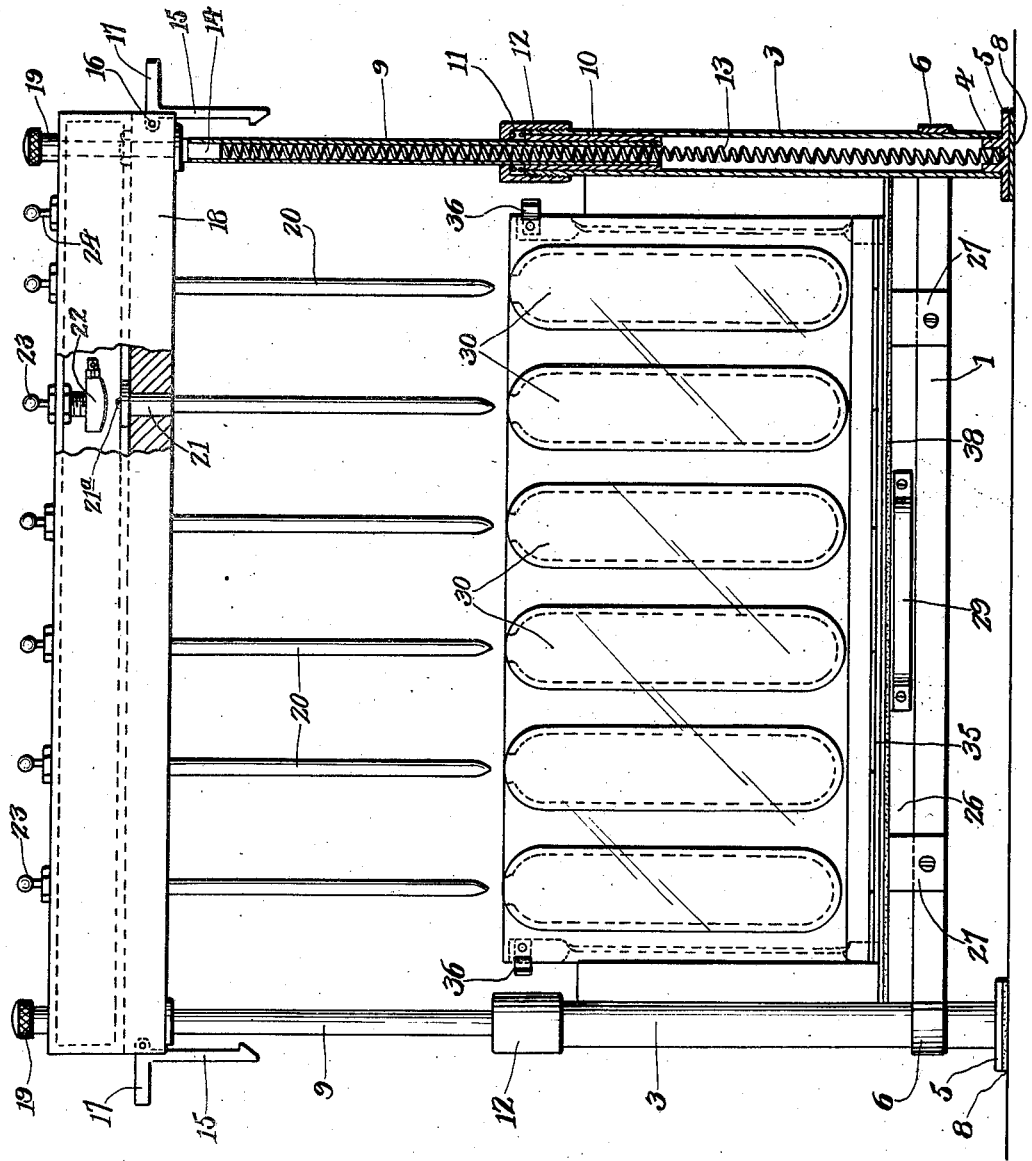
Figure 1 is a front elevation partly in section illustrating one embodiment of this invention.
Figure 2:
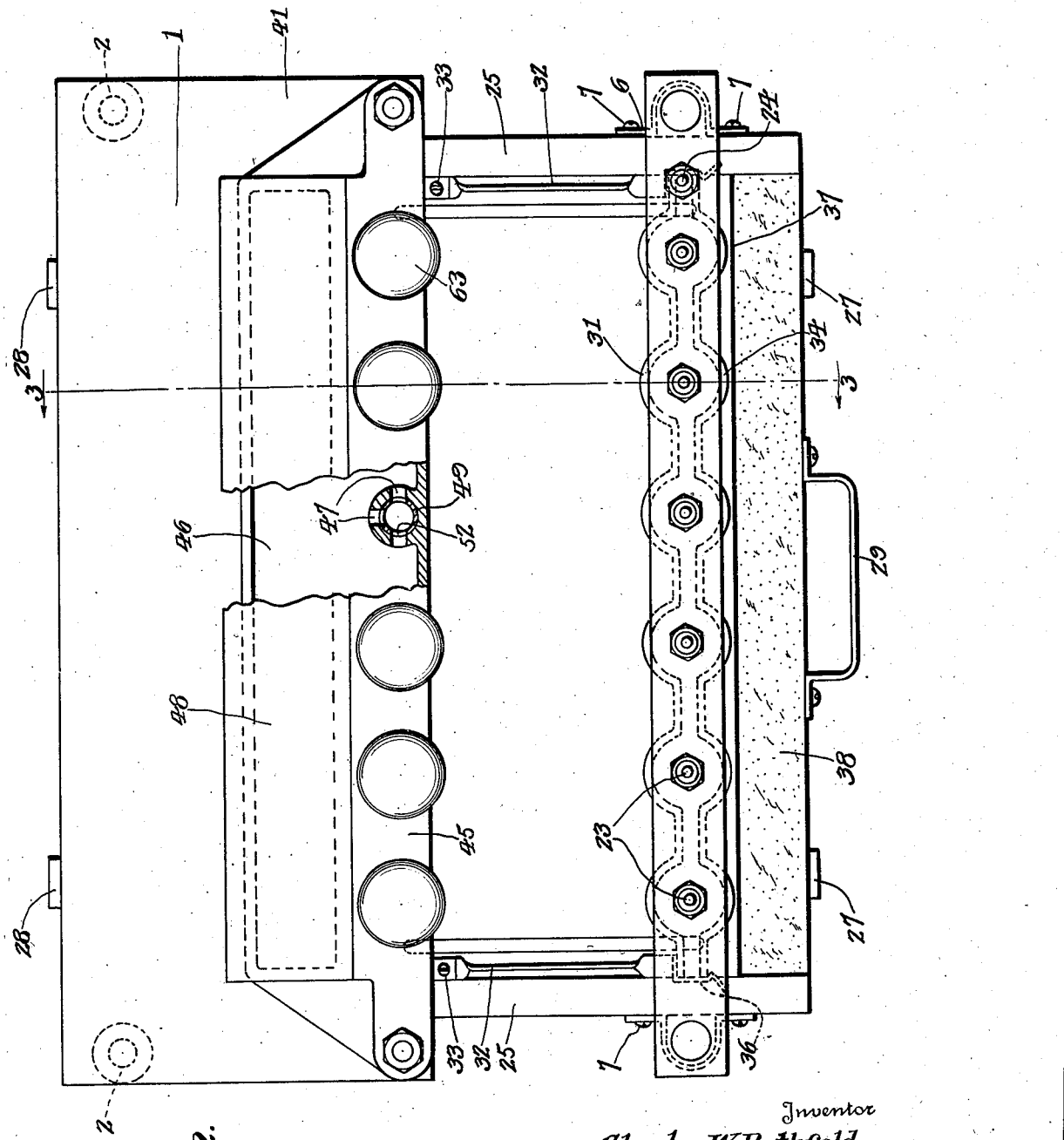
Figure 2 is a plan view also partly in section of the device illustrated in Figure 1.

The device illustrated in the drawings is provided with a flat base 1 or platform which is supported at its rearward edge by a pair of legs 2 which are secured thereto in any suitable manner. The front of this base is supported by means of a pair of tubular upright members 3 which are provided with feet or abutments 4 having laterally extending flanges 5 to provide a larger bearing surface. These tubular supports 3 are preferably secured to the sides of the base portion 1 adjacent the front edge thereof by means such as the clamping bands 6. The clamping bands 6 are provided with screws 7 for securing them to the edge of the base 1 in the well known manner. The bottom of each of the supporting members 2 and 3 is preferably provided with a layer of felt or like material 8 so that it may be set upon a polished surface without danger of marring it.

Each of the tubular members 3 extends upwardly beyond the support 1 a distance which approximately equals the length of the food units which are to be prepared. Fitting within and telescoping with each of the tubes 3 is another tube 9, the tubes 9 serving to carry at their upper ends the means for cooking or heat treating the frankfurters or the like. The tubes 3 provide guides for the tubes 9.

Each tube 9 is provided adjacent its lower end with a collar or bushing 10 which is firmly secured to the tube 9, and which fits rather snugly within the bore of the tube 3. The upper end of the bushing 10 as will be seen forms a shoulder which when the tube 9 is extended or pulled out of the tube 3 to the end of its path of movement will abut against a compression spring 11 arranged at the top of the tube 3 for that purpose. The spring 11 is held in place at the top of the tube 3 by means of a cap member 12 threadedly engaging the top of the tube 3. The cap 12 is provided with an opening of substantially the size of the tube 9 so as to permit the same to slide therethrough.

The two tubes 9 together with the structure which they carry are normally held in their upward or extended position by means of long compression springs 13 bearing at the lower ends against the abutments 4 and at the upper ends against plugs 14 provided for the purpose near the upper ends of the tubes 9. The tubes 9 together with the structure which they carry may however be maintained in their lower position by means of a pair of catches 15 which are pivotally mounted at 16 on the structure carried by the tubes 9, and which are adapted to engage the lower edges of the caps 12 when the tubes 9 are pulled down to their lowermost position. The catches 15 may be released from the caps 12 to allow the tubes 9 to be moved back up again by means of the extensions 17 provided on each of the catches 15.

The structure which has been described as being carried by the tubes 9 consists essentially of a cross member 18 secured to the tubes 9 by means of bolts 19 or the like and carrying the structure utilized in cooking or heat treating the meat.

This structure for heat treating the meat comprises a needle 20 or the equivalent for each of the units to be cooked, which needle is adapted to be inserted into the meat along the longest dimension thereof. In the embodiment illustrated, six of such needles are arranged in a gang, but it will be appreciated that any number found to be convenient may be arranged in this manner.

Figure 3:
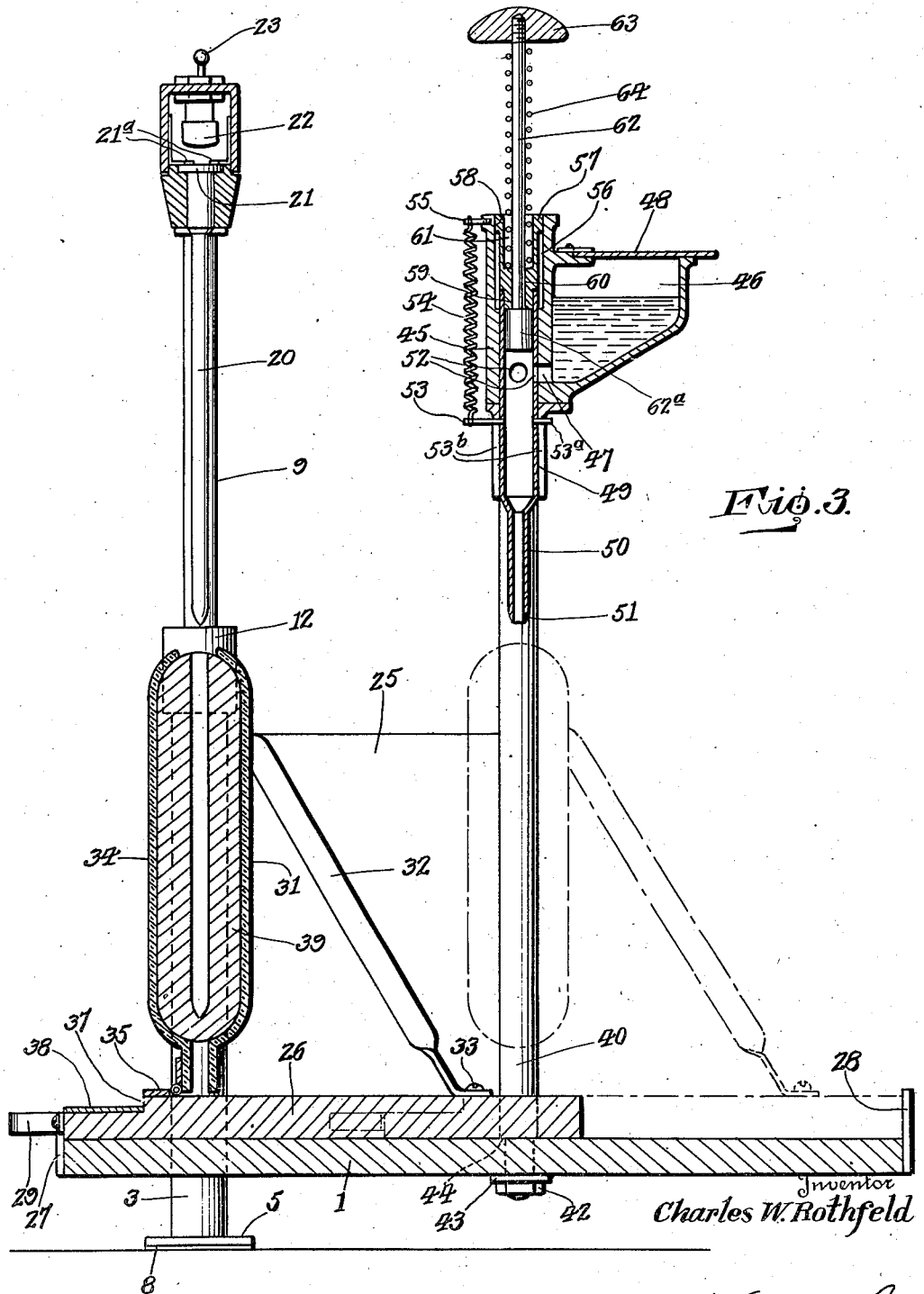
Figure 3 is a vertical section taken along the line 3—3 of Figure 2.

The needles 20 are provided each with an electric heating element adapted to raise them to a sufficiently high temperature to cook the meat thoroughly, and are each also provided with an enlarged head 21. After being inserted through holes in the member 18 from the top thereof, they are held in place by the spring contacts 21a as shown in Figure 3. The heating of each needle is controlled separately by means of individual toggle switches 22 operated by the toggles 23. Also, there is one additional switch which serves to control or to turn on or off all of the needles at one time. This switch is preferably placed in line with the other switches as shown at 24, although it may of course be placed in any other convenient location.

The base is provided at its lateral edges, that is the edges to which the tubular members 3 are attached, with a pair of braces or wall members 25 for the purpose of forming a brace for the tubular members 3, and also for other structures to be described later. These side members or braces 25 also serve the purpose of guides at the two edges of the base 1, and there is mounted between these guides a slide 26 adapted to be slid back and forth along a path at right angles to the row of needles 20. This slide is limited in its movement at the front and rear by means of stop members 27 and 28 attached to the front and rear respectively of the base member 1. The slide 26 may be provided with a handle 29 or other convenient means adjacent its front edge enabling the operator to move the slide back and forth.

Mounted on the top of the slide are a series of molds or food holders 30, so positioned as to be directly beneath the row of needles 20 when the slide is in its forward position. This row of food holders is for the purpose of holding the food in place during the cooking or heat treating operation. One holder is provided for each of the needles 20, and is positioned directly beneath its corresponding needle so that it may hold the food in proper position while it is being heat treated. These holders 30 are preferably formed from a pair of parallel spaced oblong members, one being fixed and the other hinged and one forming the back of each of the holders, and the other forming the front. As illustrated in the drawings, each member going to make up the holder is in the form of a sheet having a series of depressions in one side thereof, each depression being adapted to form half of one of the holders. The holders are preferably formed of some transparent substance such as a glass capable of withstanding the heat to which it will be subjected.

One of these sheets or pieces of material going to make up the food holders is fixedly mounted in an upright position on top of the slide 26 as indicated at 31 in the drawings. In order to maintain this part in its upright position, a brace 32 is provided and attached at its upper end adjacent the top edge of the part 31, and its lower end to the top of the slide 26 at a point spaced from the bottom of the member 31. It is preferably attached to the slide 26 by some means such as a screw 33.

The other member going to make up the food holder is also mounted on the slide 26 in opposed relation to the member 31, as is clearly shown in the drawings at 34. This member however is provided with a hinge 35 at its lower edge by which it is attached to the top of the slide 26. By this expedient it will be seen that the part 34 may be swung downwardly about its hinge 35 to open up the food holders for the purpose of placing the frankfurters or the like in the same, or for taking them out. A spring catch member 36 is provided at each end of the fixed part 31 for the purpose of engaging the part 34 when it is in its closed position in order to maintain it in such position and retain the food units while they are being cooked. These catch members 36 may be secured to the part 31 by the same means that is used in securing the brace 32 to this part at its upper end.

As shown in Figure 3, the slide 26 is cut away or notched at 37 adjacent its forward edge so as to accommodate the bulged portions of the member 34 when such member is in open position. The bottom of this notched or cut away portion is also preferably lined with felt or the like 38 to form a cushion for the part 34 and prevent it from being scratched or broken by contact with the slide 26.

The operation of the foregoing construction will be readily apparent to those skilled in the art. The hinged part of the mold or food holder is first lowered and a number of Frankfurters or like units of food 39 are placed in the depressions therein which have been described above.

This member 34 is then raised to its closed position and held in position by the catches 36. With the slide 26 in its extreme forward position, the member 18 mounted on the slidable tubes 9 is then pulled downwardly to force the needles 20 into the units of food 39 as will clearly appear from the drawings. It will be seen that the needles 20 are so formed as to length that they will extend substantially the entire length of each of the units 39, and will thus be able to distribute the heat uniformly throughout these units. When the member 18 is pulled down as just described, the catches 15 will engage the lower edges of the cap members 12 and hold member 18 with the needles 20 in their lowermost position against the tension of the spring 13. All of the switches 22 and 24 are then turned to their on position and allowed to remain there until such time as the food requires to be thoroughly cooked. The projections 17 on the catch members 15 are then lifted simultaneously to disengage the catch members from the caps 12, and the tension of the spring 13 will return the member 18 and the needles 20 to their original uppermost positions.

Mounted on the base 1 on each side of the slide 26 and at the rearward ends of the braces 25 are a second pair of posts or supporting columns 40. These supporting columns are preferably secured to the base 1 by being inserted in perforations in an offset portion 41 of the base, and by having a nut 42 threadedly engaging at its lower end below the base 1. A washer 43 may be used between the base and the nut 42. The lower end of the column 40 which extends through the base 1 is reduced in cross section as shown in Figure 3 to form a shoulder 44 which is clamped against the top of the base. This column 40 is also preferably secured to the rearward end of the braces 25 to further strengthen them in their upright positions.

Secured to the tops of the columns 40 and extending between them is a member 45 having a series of vertical openings therethrough corresponding in number and position to the food holders 30 on the slide 26 and adapted to receive a plunger mechanism which will be presently described. This member 45 is also formed rearwardly of the openings just mentioned as to provide a well or hopper 46 adapted to receive a liquid or semi-liquid seasoning mixture to be injected into the food. Openings 47 are formed between the aforementioned vertical openings and the well 46 whereby the seasoning may pass from the well into the vertical openings. The well is provided with a cover 48 which may be formed in any suitable manner.

Disposed within the vertical openings in the member 45 is a sleeve 49 having a restricted lower portion 50 and having its lower end 51 formed to enter the openings left by the needles 20 in the Frankfurters or other foods. This sleeve is also provided with opening 52 which normally register with the openings 47 leading to the well 46. The sleeve 49 also carries a pin 53 which projects laterally therefrom and is adapted to receive a spring 54 having its other end attached to a pin 55 carried by the member 45. This spring as will be seen from the drawings serves to retain the sleeve 49 in its uppermost position as shown in Figure 3. Immediately opposite the pin 53 is a second pin 53a, these pins being slidable in vertical guide slots 53b for the purpose of preventing rotation of the sleeve 49.

The upper parts of the vertical openings through the member 45 are slightly enlarged as shown at 56 in the drawings. This enlarged portion 56 is adapted to receive a member 57 which engages the upper end of the sleeve 49 and has substantially the same outer diameter as the sleeve for a portion of its length, but is provided at its upper end with an enlarged shoulder portion 58. The member 57 may have a reduced portion at its lower end to fit within the top of the sleeve 49 and accurately position it with respect to the sleeve as indicated at 59.

The member 57 is provided with a bore extending therethrough and comprising a reduced section 60 adjacent the bottom of the member and an enlarged section 61 adjacent the top of the 15 member. A plunger 62 of substantially the same diameter as portion 60 of the bore through the member 57, is adapted to slide up and down in the member 57 for a purpose which will be later described. The plunger 62 is provided at its lower end with an enlarged portion forming a piston 62a, and at its upper end with a knob 63, and is surrounded between such knob and the member 57 by a spring 64 adapted to hold it in its uppermost position. The spring 64, as will be seen from Figure 3, extends within the portion 61 of the bore through the member 57 and rests against the shoulder between the portion 61 and the portion 60 of that bore. This spring 64 is so constructed as to be somewhat stronger than the spring 54 which has been previously described.

From the foregoing, the operation of the entire device which has been described will be clearly apparent. After the Frankfurters or other food units have been cooked in the manner previously set forth, and after the needles 20 have been lifted therefrom and the current shut off, the slide 26 is pressed back against the rear stop 28 on the base 1 by means of the handle 29 provided for that purpose. When the slide is against this rear stop, the various members carried by the slide will assume a position shown in dotted lines in Figure 3. From this, it will be clearly apparent that the holes which have been left in the food units 39 by the needles 20 will be positioned respectively beneath the lower ends 51 of the sleeves 49 of the seasoning mechanism.

The well or hopper 46 being filled or partly filled with liquid or semi-liquid seasoning as previously set forth, and the upper portion of the sleeve 49 being likewise filled with the same substance by virtue of the openings 49 and 52, the device is now in position to proceed with the seasoning of the food which has been cooked. It will be apparent that the bore through the lower part 50 of the tube or sleeve will be made small enough so that the semi-liquid seasoning in the hopper 46 will not flow out therethrough until such time as the plunger 62 is forced into the upper part of the tube. After all parts have been placed in readiness as just described, pressure is exerted upon the knob 63. The spring 64 against which the knob 63 bears being stronger than the spring 54 which serves to hold the sleeve in uppermost position, the spring 54 will be stretched and the sleeve 49 will be forced downwardly. It will be seen that as soon as this action takes place the openings 52 in the sleeve 49 will fail to register with the openings 47 in the hopper member 46, and thus the communication between the interior of the sleeve 49 and the hopper 46 will be shut off. Further downward movement of the knob 63 will cause the sleeve 49 to move to such position that the lower end of the sleeve 51 will locate and enter for a short distance the openings which have been left in the food units by the needles 20. This downward movement of the sleeve will continue until the shoulder portion 58 of the member 57 comes in contact with the lower end of the enlarged portion 56 of the openings through the member 45. It will be seen that any downward movement of the sleeve will then be arrested, and further downward movement of the knob 63 will compress the spring 64 and cause the enlarged part to slide down in the opening in the sleeve 49. The obvious result of forcing the plunger 62 downward is to forcibly expel a portion of the seasoning from the opening into the hole left in the feed unit below. The forcing of this seasoning into the food units in the manner carried out by this device will cause the seasoning to permeate the food to a very thorough extent and thus cause it to be much more palatable than if the seasoning were placed on the outside in the usual manner.

It will be seen that by the foregoing there has been disclosed a means for carrying out all of the objects of this invention in a novel and advantageous manner.

It will be further seen that there has been provided a means for cooking units of food from the interior thereof instead of from the exterior and for subsequently injecting into those units a seasoning. It will further be seen that the means providing the various operations on these foods can be closely observed at all times.

What I claim is:—

1. In a device of the character described, a support, a cross head positioned above said support, upstanding vertically movable spring controlled means carrying said cross head and fixedly secured to said support, a set of downwardly directed spaced electrically heated piercing and cooking elements carried by the cross head, a food holder member secured in an upright position with respect to said support and having a set of depressions in one face thereof corresponding in number and position to said piercing and cooking elements, a second food holder member hingedly mounted with respect to said support adjacent said first food holder member and on the side thereof having said depressions, said second member having a set of depressions complementary to those in said first member whereby when in its upright position it will form with said first member a set of spaced food holders, and said members being spaced apart adjacent the upper portion of each food holder when said second member is in upright position to admit the respective piercing and cooking elements for the purpose of piercing and cooking from the interior thereof the food contained in the holders.

2. In a device of the character described, a support, a cross head positioned above said support, upstanding vertically movable spring controlled means carrying said cross head and fixedly secured to said support, a set of downwardly directed spaced electrically heated piercing and cooking elements carried by the cross head, a food holder member secured in an upright position with respect to said support and having a set of depressions in one face thereof corresponding in number and position to said piercing and cooking elements, a second food holder member hingedly mounted with respect to said support adjacent said first food holder member and on the side thereof having said depressions, said second member having a set of depressions complementary to those in said first member whereby when in its upright position it will form with said first member a set of spaced food holders, and said members being spaced apart adjacent the upper portion of each food holder when said second member is in upright position to admit the respective piercing and cooking elements for the purpose of piercing and cooking from the interior thereof the food contained in the holders, said spaces between said members being small enough however to positively hold the food in said holders while the piercing and cooking elements are being withdrawn.

3. In a device of the character described, a support, a cross head positioned above said support, upstanding vertically movable spring controlled means carrying said cross head and fixedly secured to said support, a set of downwardly directed spaced electrically heated piercing and cooking elements carried by the cross head, a food holder member secured in an upright position with respect to said support and having a set of depressions in one face thereof corresponding in number and position to said piercing and cooking elements, a second food holder member hingedly mounted with respect to said support adjacent said first food holder member and on the side thereof having said depressions, said second member having a set of depressions complementary to those in said first member whereby when in its upright position it will form with said first member a set of spaced food holders, and said members being spaced apart adjacent the upper portion of each food holder when said second member is in upright position to admit the respective piercing and cooking elements for the purpose of piercing and cooking from the interior thereof the food contained in the holders, said spaces between said members being small enough however to positively hold the food in said holders while the piercing and cooking elements are being withdrawn, catch means for holding said second member in its upright position during the cooking operation, and means on said support for receiving said second member when in its horizontal position.

4. In a food preparing device of that type including a vertically movable combined food piercing and cooking structure, a food filling structure and a food holder structure for successive coaction with said combined food cooking and piercing structure and said filling structure, the combination of a base, spaced stationary upstanding guides for said combined food piercing and cooking structure secured to the base, upstanding supports secured to the base for said food filling structure and arranged rearwardly of said guides, a slidable carrier mounted on said base between the said supports and the said guides and adapted to have secured thereon, near the front thereof, said holder structure for successively positioning the latter to coact with the combined food piercing and cooking structure and the said filling structure, and stops arranged at the front and rear ends of said base and coacting with the carrier to provide for the setting of said holder structure successively in coacting position with said combined piercing and cooking structure and said filling structure.

5. In a food preparing device a platform, a carrier slidably mounted thereon, a structure including a set of vertically disposed sectional normally closed food holders mounted in stationary position upon the outer end of said carrier, a cross head positioned over said platform, a pair of spaced parallel vertically movable spring controlled telescopic means carrying said crosshead and fixedly secured to said platform adjacent said carrier, a set of spaced electrically heated piercing elements carried by and depending from the cross head for forming vertical bores in and for cooking the articles of food carried by the holders when the carrier positions the latter below said elements, and said structure including means for detachably connecting the sections of the food holders together for closing the latter.

6. In a food preparing device a platform, a carrier slidably mounted thereon, a structure including a set of vertically disposed sectional normally closed food holders mounted in stationary position upon the outer end of said carrier, a cross head positioned over said platform, a pair of spaced parallel vertically movable spring controlled telescopic means carrying said crosshead and fixedly secured to said platform adjacent said carrier, a set of spaced electrically heated piercing elements carried by and depending from the cross head for forming vertical bores in and for cooking the articles of food carried by the holders when the carrier positions the latter below said elements, and said structure including means for detachably connecting the sections of the food holders together for closing the latter, one of the sections of the food holders being fixed to and the other being hinged to the carrier, and said holders being open at their upper and lower ends for the passage entirely therethrough of said piercing elements.

7. In a food preparing device a platform, a carrier slidably mounted thereon, a structure including a set of vertically disposed sectional normally closed food holders mounted in stationary position upon the outer end of said carrier, a cross head positioned over said platform, a pair of spaced parallel vertically movable spring controlled telescopic means carrying said crosshead and fixedly secured to said platform adjacent said carrier, a set of spaced electrically heated piercing elements carried by and depending from the cross head for forming vertical bores in and for cooking the articles of food carried by the holders when the carrier positions the latter below said elements, and said structure including means for detachably connecting the sections of the food holders together for closing the latter, one of the sections of the food holders being fixed to and the other being hinged to the carrier, and said holders being open at their upper and lower ends for the passage entirely therethrough of said piercing elements, and said cross head and said telescopic means having coacting parts for latching said elements in cooking position.

8. In a food preparing device a platform, a carrier slidably mounted thereon, a structure including a set of vertically disposed sectional normally closed food holders mounted in stationary position upon the outer end of said carrier, a cross head positioned over said platform, a pair of spaced parallel vertically movable spring controlled telescopic means carrying said cross head and fixedly secured to said platform adjacent said carrier, a set of spaced electrically heated piercing elements carried by and depending from the cross head for forming vertical bores in and for cooking the articles of food carrried by the holders when the carrier positions the latter below said elements, and said structure including means for detachably connecting the sections of the food holders together for closing the latter, and said cross head and said telescopic means having coacting parts for latching said elements in cooking position.

CHARLES W. ROTHFELD.